Patented Oct. 11, 1932

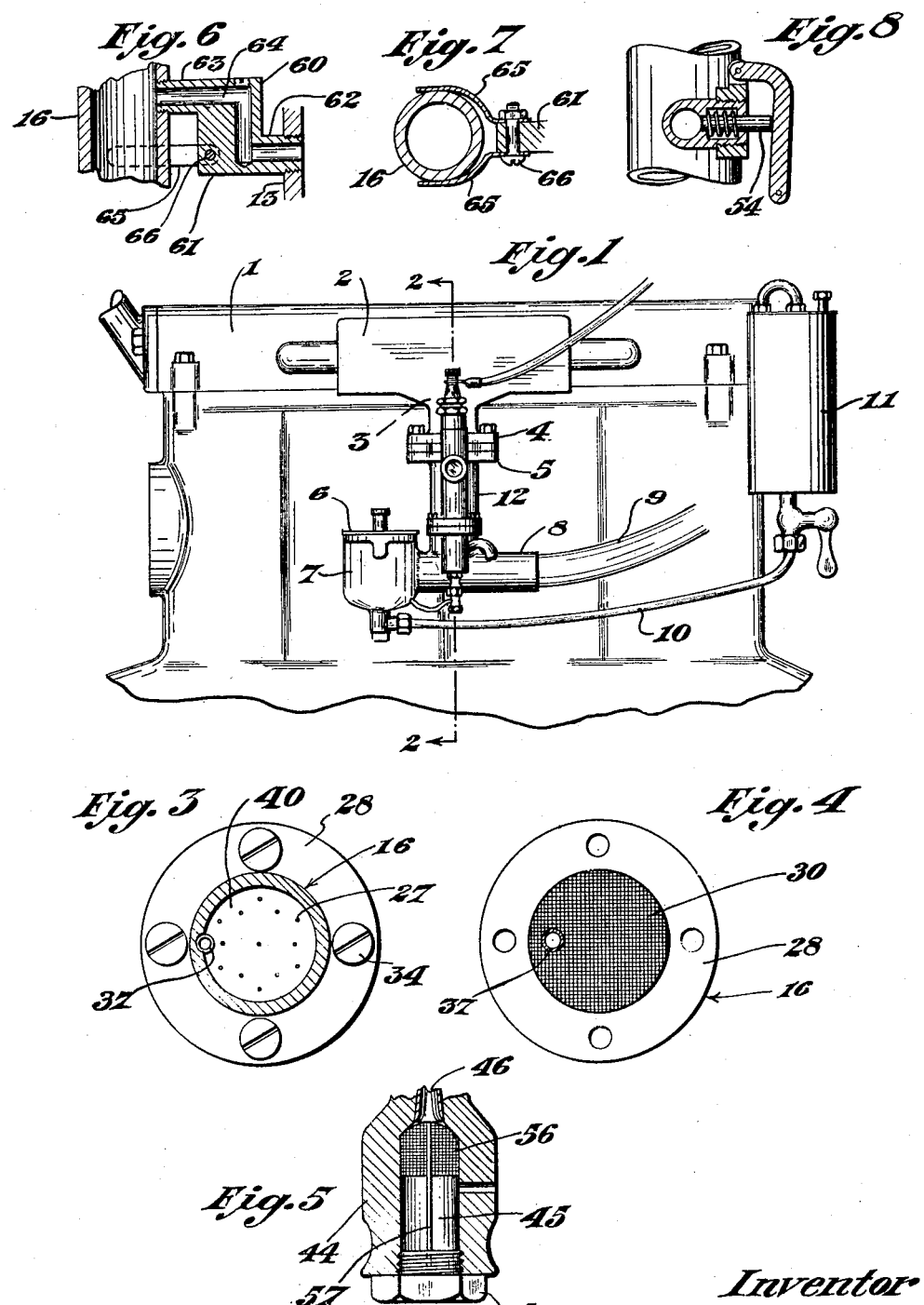

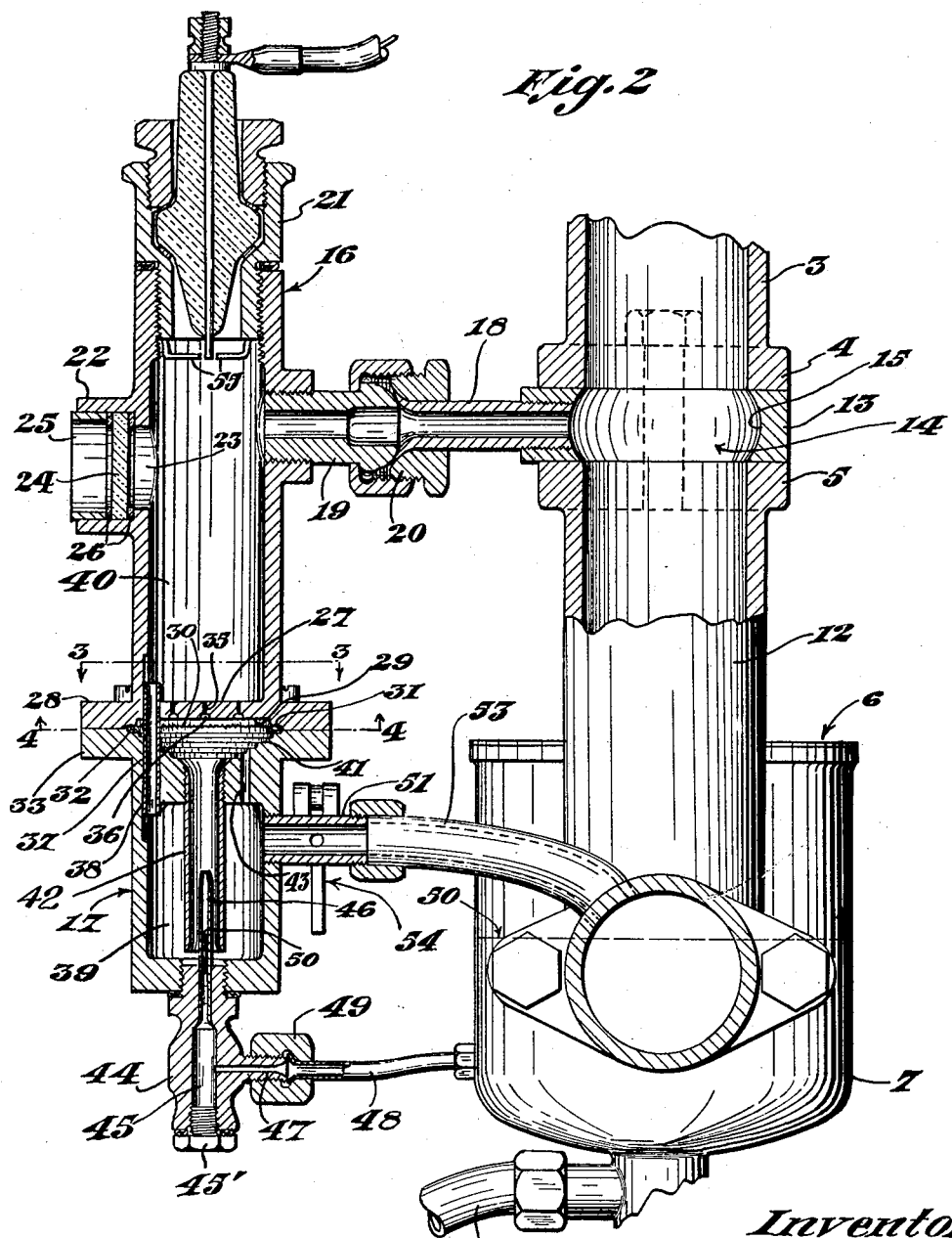

1,881,425

UNITED STATES PATENT OFFICE

HERBERT V. A. FERGUSON, OF BUFFALO, NEW YORK

LIQUID FUEL GASIFIER

Application filed August 26, 1927. Serial No. 215,603.

This invention relates to a charge forming apparatus and particularly to an apparatus for forming an efficient highly combustible charge for admission into the cylinders of an internal combustion engine.

Heretofore apparatus has been constructed to increase the efficiency of carburetors and other charge forming devices by utilizing the heat of the exhaust for heating the fuel before atomization, heating the intake manifold so as to heat the atomized fuel as it passes therethrough, and for supplying a portion of hot exhaust gas into the manifold for intermixture with the atomized fuel passing into the engine to impart heat thereto and more efficiently vaporize the fuel. Various forms of constructions have also been provided in the prior art for utilizing electricity and other forms of heat generating devices to provide hot spots, and the like for heating the charges of fuel passing through the carburetor or intake manifold in order to increase the vaporization of the fuel so that greater efficiency in the operation of an internal combustion engine may be obtained. Some of these devices use the heat of combustion of vaporized fuel charges for intermixture with the charge from a carburetor to supply the main operating charge for the engine in which the combustion gases radiate heat in the mixture as they pass into the cylinder.

All of these various methods of pre-heating the gasolene and vapor before entry into an internal combustion engine have substantial disadvantages and inefficiencies which are well known in the art. They are principally deficient in that they reduce the amount of combustible charge by intermixture of combustion gases therewith, or in the case of hot spots or heating devices for the carburetor and manifold sufficient heat is not absorbed by the gases passing into the engine to materially aid the combustibility and vaporization thereof. As a result an increase in efficiency of a proper degree is not usually obtained with these devices and it is therefore not economical to equip internal combustion engines with them in view of the provision of additional parts which require maintenance and adjustment.

This invention is designed to overcome numerous of these difficulties had with previous devices and at the same time to materially increase the efficiency of operation of an internal combustion engine and to economize in the use of fuel by obtaining a more highly vaporized and combustible fuel charge, at the same time providing a structure which will increase the ease of starting and efficiency of operation in cold weather when the usual fuels, such as now used, do not readily vaporize. This invention is further designed and found to provide fuel economy over the various speed ranges of automobiles and especially at high speeds where carburetors are usually inefficient, and to supply proper fuel mixtures for quick acceleration under loads.

To this end, this invention provides a charge forming apparatus in which a primary charge for operating an internal combustion engine is obtained from a primary carbureting device while a secondary atomized charge is obtained from a secondary carbureting device following which it is ignited by suitable means and immediately withdrawn through a passage of small diameter with respect to the ignition chamber and intermixed with the primary charge from the primary carbureting device, the burning of the fuel being quenched in passing through the reduced passage with the aid of the suction of the engine so as to prevent the formation of a charge of combustion gas but which will be sufficient by incipient ignition to change the vaporized secondary charge into a gaseous form and generate a substantial amount of heat. This hot gas charge when intermixed with the vaporized charge from the primary carburetor will more completely vaporize and heat this primary charge as it passes into the internal combustion engine and in addition supplies a highly ignitable gas intermixed throughout the vaporized primary charge and when compressed in the internal combustion engine, it will form an operating charge of a more quickly burning character in which the rate of detonation is materially increased. By reason of the quickly burning character of this charge it will generate more power and have substantially complete combustion in the cylinder so that little waste gas is discharged from the engine and thereby effect fuel economy.

This invention provides a method of forming a charge for internal combustion engines which includes the formation of two vaporized fuel charges in separated chambers or conduits with the subsequent incipient ignition of one charge and its immediate choking and quenching with immediate intermixture with the other charge which aids in the quenching of the first charge and absorbs the heat thereof to form a combined vaporized and gasified fuel charge of a highly combustible and quick burning character.

The invention further provides an apparatus which may be incorporated into a carburetor structure and which may also be constructed in the form of an attachment for use with present types of carbureting devices on internal combustion engines, and adapted for ready attachment to the carburetors and intake manifolds in a manner in which the combination will efficiently operate to carry out the features of this invention.

The invention comprehends numerous other objects resulting from the method and apparatus employed, which are all more particularly pointed out in the following description and claims directed to the preferred form of construction, it being understood however that various developments in modification and design of the structure and relation of parts may be made without departing from the spirit and scope of the invention as herein set forth.

In the drawings forming part of this application;

Fig. 1 is a side elevation of an internal combustion engine showing the carburetor device and intake manifold with the present invention applied thereto;

Fig. 2 is a vertical sectional view through the intake manifold and carburetor and the present invention taken approximately on line 2—2 of Fig. 1, parts of the carburetor being shown in elevation;

Fig. 3 is a sectional view taken on line 3—3 of Fig. 2;

Fig. 4 is a sectional view taken on line 4—4 of Fig. 2;

Fig. 5 is a vertical substantially enlarged sectional view through the metering jet unit, parts being broken away to particularly illustrate the fuel filter in said nozzle member and the manner in which it is supported by the plug forming the closure for a sediment trap;

Fig. 6 is a sectional view through a slightly different form of choke member showing a construction for attachment to carburetors where the outlet from the ignition chamber is offset relative to the flange on the carburetor and intake manifold;

Fig. 7 is a sectional view taken on line 7—7 of Fig. 6 showing the clamp for the choke member; and Fig. 8 is a detail sectional view of the air controlling valve for the air inlet of the secondary carbureting device.

An internal combustion engine of any suitable type, such as is now well known in the art, is indicated at 1 which is provided as usual with the intake manifold 2 having a depending portion 3 provided with a flange 4 on the lower end thereof to which is usually secured the flange 5 of the carburetor 6. The carburetor has the usual float chamber 7 and the air intake 8 which is usually connected to the flexible conduit 9 extending to a suitable air heating device attached to the exhaust manifold in any of the usual structures now used. A fuel supply line 10 extends from a suitable vacuum tank 11 to the bottom of the float chamber 7 in the usual manner. The mixing chamber of the carburetor is indicated at 12 which may be of any suitable type well known in the art, the structural relation shown being merely for the purpose of illustration.

The present invention provides the addition, to this usual charge forming structure for an internal combustion engine, of a spacer member 13 adapted to be positioned between the flanges 4 and 5 and secured in liquid tight relation therebetween through the use of the usual securing bolts. The central portion of this member is provided with an opening 14 of a size corresponding to the passage through the intake manifold and having the central portion enlarged as indicated at 15 to aid in the mixing of the primary and secondary fuel charges in a manner which will be hereafter described.

A secondary charge forming device includes a body member formed of the sections 16 and 17 mounted preferably in vertically alined relation as shown in Figs. 1 and 2. The section 16 of the body forms an ignition or gasifying chamber, and is connected by the choke member 18 so that the interior of the section 16 communicates with the intake manifold. The member 18 is threaded into the spacing member 13 and is attached to the section 16 through the means of the threaded nipple 19 carried by section 16 and the coupling members 20 securing the swaged end of the pipe 18 in liquid tight engagement with the end of the nipple 19 as clearly shown in Fig. 2. Any other means of connecting the ignition chamber to the intake manifold may be used if desired, such as a straight pipe connection threaded in the section and the spacing member or by the offset construction as shown in Fig. 6.

The upper end of the section 16 of the body member has a threaded opening for receiving and mounting the spark plug 21 in liquid tight relation therein so that the sparking points of the plug in the assembled relation of the parts lie slightly above the horizontal plane of the choke member 18. The section 16 is formed with an annular laterally projecting flange 22 opposite to the nipple 19 and its mounting in the section 16, while the wall of the chamber is provided with a sight opening 23 arranged in concentric relation with the flange 22 and of smaller diameter, this sight opening being covered by the sight glass 24 so as to close the chamber from communication with the outside atmosphere in the normal operation of the apparatus. A suitable sleeve 25 engaging packing washers 26 when forced into the sleeve extension 22 effectively seals the joint between the sight glass 24 and the edge portion of the sight opening 23 so as to prevent leakage.

The lower end of section 16 of the body is closed by the transverse wall 27 lying in the same plane as the outwardly extending flange 28 on the lower end of the section. The bottom of the section 16 is provided with recess 29 in which is placed the breaker screen 30 while the angular shoulder 31 receives the gasket 32 to form a liquid tight joint with the opposed end of the section 17 when the flange 33 thereof is engaged with the flange 28 and secured thereto by suitable screws or the like 34. One or more breaker screens may be used as desired. The transverse wall 27 is formed with a plurality of jet openings 35 which are of small diameter at their upper ends and have counter-sunk portions 36 at their lower ends so that they will effectively operate to cause complete atomization of fuel passing therethrough with the air. These openings are arranged in a substantial star-shape as indicated in Fig. 3, this being found to produce better results than other arrangements which have been used. An air by-pass 37 is mounted in one side of the transverse wall as shown in Fig. 2 and projects downwardly through the screen 30 and into the passage 38 provided in the section 17 of the body so as to permit by-passing of air from the chamber 39 in the section 17 to the ignition chamber 40 of section 16 for mixture with the atomized fuel from the openings 35.

The by-pass 37 terminates above the upper face of transverse wall 27 so that any excess liquid fuel will tend to flow through the jet openings and will be acted on by the air drawn through said openings and be vaporized thereby.

The upper end of the section 17 is formed with a plurality of concentrically arranged ledges 41 arranged in stepped relation as clearly shown in Fig. 2 while the central portion below the ledges mounts the air tube 42 extending through the air chamber 39 and terminating in adjacent spaced relation to the bottom thereof. A suitable air passage 43 is formed adjacent to the tube 42 in the upper end of section 17 to permit air to communicate with the stepped ledges 41 for a purpose which will presently appear.

The bottom of the section 17 is provided with a threaded opening detachably receiving the metering jet unit 44 having the sediment trap 45 formed in the lower end thereof and closed by the plug 45'. The upper end communicates with the metering jet 46 extending upwardly into the air tube 42 in concentric relation and terminating in the central portion of the length of said tube as clearly shown in Fig. 2. A threaded projection having a central bore communicating with the sediment trap is indicated at 47 and formed on the metering jet unit for receiving connection of the fuel supply conduit 48 attached thereto by the nut 49 in any suitable manner well known in the art. This fuel supply pipe 48 at its opposite end is attached to the float chamber 7 of the carburetor so as to supply fuel to the metering jet unit, the level of which is controlled by the level of the liquid fuel in the carburetor as indicated at 50. The body member is always set in a predetermined relation with the carburetor so that the proper fuel level may be obtained in the metering jet. The pipe section 51 is threaded into the side portion of section 17 at the upper end thereof and has a flexible tube 53 connected thereto and to the air intake 8 of the carburetor so as to obtain a suitable supply of heated air for admission into the air chamber 39 of section 17. A suitable spring opened valve 54 as shown in Fig. 8, may be operated in any suitable manner to control the amount of air passed through the pipe section 51 which is useful in starting an internal combustion engine equipped with this invention during cold weather. In this connection it is to be understood that the air intake for the chamber 39 may be connected at a suitable place with the intake for hot air in advance of the carburetor or may be an entirely separate intake if desired.

The spark plug 21 is provided with copper sparking terminals 55 in view of the greater wear or load which is placed thereon in the operation of the invention as it has been found that copper terminals do not burn or oxidize as readily as terminals of other material.

With particular reference to Fig. 5 it will be noted that a filtering screen is indicated at 56 which is mounted in the sediment trap 45 of the metering nozzle unit which is supported in position by the pin 57 to which the central portion of the screen is suitably connected at the upper end, while the lower end of the pin 57 is supported in an opening formed in the plug 45'. This will prevent any foreign matter from getting in the metering nozzle which might tend to clog the small opening in the upper end thereof.

The above described construction carries out the method of this invention in cooperation with the carbureting device 6 and the intake manifold 2. This improved method of forming a charge consists in obtaining a main charge of atomized fuel from the usual carburetor 6 by the suction of the engine through the intake manifold. With the same suction in the intake manifold acting through the choke member 18 and through the body composed of the assembled sections 16 and 17, air is drawn through the pipe section 51 and the flexible pipe 53 into the air chamber 39. This air in the chamber 39 is then sucked through the tube 42 as well as the pipe 37 and passage 43 and subsequently passes into the ignition chamber 40. In passing through the tube 42 the air moving upwardly exerts a suction to draw fuel from the metering nozzle 46 which travels upwarly and strikes the screen 30 where it is broken up into finally divided form, and with the air passes through the jet openings 35 so that the air and the fuel is finally mixed to provide a vaporous mixture. The air passing through the passage 43 aids in the vaporization and atomization of the fuel passing through the screen 30 and the jet openings. Any excess liquid fuel that may be withdrawn from the jet nozzle 46 will drop downwardly onto the ledges 41 and the air through the passage 43 together with that passing through tube 42 will aid in vaporizing this free fuel. A further charge of air is admitted through the pipe 37 into the ignition chamber where it becomes intermixed with the vaporized fuel from the jet openings 35. The air and vaporized fuel is drawn upwardly through the ignition chamber by the suction of the engine acting through choke member 18, and as it reaches the top of this chamber is ignited by the spark from spark plug 21 which starts ignition of the mixture. Immediately as the mixture begins to burn after its ignition by the spark, it is drawn by the suction of the engine into the choke tube 18 where the action of burning is quenched to a considerable degree especially in view of the existence of suction or vacuum tending to reduce combustion rather than promote it. As this burning gas under this choking action is then drawn into the intake manifold at the enlarged portion 15 of the spacing member it is distributed around the spacing member in this enlarged portion to mix with the primary charge of vaporized fuel coming from the main carbureting device 6 which cooperates to finally choke and quench any remaining flame and prevent burning of the ignited charge of secondary fuel coming from the section 16.

The partial ignition and molecular decomposition of the secondary fuel charge generated in the body member which is immediately quenched generates a substantial heat, causes a reaction in the vaporized mixture resulting in the gasifying of the mixture. This gasifying produces a more highly combustible gas and not gaseous products of combustion; that is, the partial and molecular decomposition produced by incipient ignition and immediate quenching of the secondary charge or mixture produces principally a gaseous, highly explosive fuel with a large tolerance between the upper and lower explosive limits, and heat, while only a trace of products of combustion is present. As this combustible gaseous charge enters the intake manifold and becomes intermixed with the primary vaporized charge from the main carbureting device it heats and more thoroughly vaporizes the primary charge, the heat being absorbed by the mixture of the primary and secondary charges as they pass through the intake manifold. As a result of mixing heated highly combustible gases, that is, gases which when mixed with air over a very wide range of composition will detonate when so admixed and subjected to an igniting influence a charge is formed for an internal combustion engine which consists of a highly atomized portion of fuel and a gasified portion intimately intermixed therewith which when compressed in the cylinder forms a highly combustible mixture which will burn more rapidly and with greater efficiency than the ordinary vaporized mixtures obtained from the types of carbureting and charge forming devices in present use. This mixture results in a substantially complete burning of all of its contents so that there is little waste which passes into the exhaust and therefore a maximum portion of the fuel is converted into useful power resulting in a considerable saving in fuel, thereby effecting economy in operation of an internal combustion engine and at the same time increasing the efficiency of operation of the engine.

This method of preparing a charge for an internal combustion engine has been found to materially accelerate the detonation of the charge in the engine cylinder, or increase the rate of propagation of flame through the charge in the cylinder as compared with the detonation wave or rate of propagation of the flame with an ordinary compressed vaporized fuel charge of any of the types now used in gasoline operated internal combustion engines. This result is obtained through this method by means of the wide explosive limits of the combustible gas intermixed with the vaporized fuel forming the charge provided for the engine by this invention. The explosive limits of mixtures supplied to internal combustion engines have an important control on the efficiency of operation thereof. For example, ordinary gasoline as now used in internal combustion engines will not burn when mixed with air, if the amount of gasoline is less than six per cent per unit of mixture, or more than twelve per cent. As a result, gasoline has a relatively small limit in proportion with air within which combustion suitable for the operation of an internal combustion engine can be obtained. On the other hand, carbon monoxide may be used in a mixture with air varying from sixteen and five tenths per cent to seventy-four and ninety-five hundredths per cent of gas in the mixture and yet efficient combustion may be obtained. To obtain a combustible mixture of hydrogen and air we may have a percentage of hydrogen in the mixture varying from nine and forty-five hundredths per cent to sixty-six and four tenths per cent and with water gas a variation of from twelve and four tenths per cent to sixty-six and seventy-five hundredths per cent of gas in the mixture. From this it will be seen that carbon monoxide, hydrogen and water gas have substantially wide explosive limits in admixture with air as compared to gasoline, as a result of which it is obvious that a mixture of a gas having wide explosive limits in an atomized or vaporized charge of gasoline having relatively limited explosive limits, the detonation value of these gases having wide explosive limits and consequently, a more rapid detonation than gasoline, produces a much more desirable charge for operating an internal combustion engine.

The present invention and method for preparing a fuel charge uses this variable mixture of gases, because in the ignition chamber of the secondary charge forming device, the incipient ignition of the secondary fuel mixture, may have a proportion of air and gasoline in vaporized form, just beyond either of the combustion limits of gasoline as above described; so that upon ignition, a molecular decomposition of the atomized mixture is obtained which will form carbon monoxide, hydrogen, water gas, or a mixture of one or more of these gases, together with the heat formed by the decomposition. When this is mixed with the primary vaporized fuel charge from the primary carbureting device it will not only heat the primary charge but will intermix with this primary charge and more completely vaporize the same. In addition, a small portion of water or water vapor is generated in the partial ignition or decomposition of the secondary fuel charge when the incipient ignition takes place, which will also aid in admixture with the primary fuel charge and the gaseous products of the decomposition of the secondary fuel charge, in providing a mixture for the operation of the internal combustion engine in which under the high temperatures of operation of the engine, this water vapor will materially aid in preventing the formation of carbon deposits, by means of the well known water gas reaction. As a result this will aid in generating combustible gases which may be carbon monoxide and hydrogen, and thereby preventing the deleterious deposition of carbon in the engine and using it to advantage to produce combustible gases which will generate more power for a given quantity of fuel in cooperation with the combustible gases generated in the ignition chamber of the secondary carbureting device.

In addition, this generation of gas in the secondary carbureting device having wide explosive limits in a mixture with air provides a highly explosive medium which, when entering and compressed in an engine cylinder, thoroughly intermixes throughout the entire primary charge; and by means of its almost spontaneous detonation by the usual sparking device in the engine cylinder, it immediately propagates the flame to the entire charge in the cylinder, materially increasing the rate of detonation of the mixture so that complete combustion will take place before any appreciable movement of the piston downwardly on its power stroke, or at least a considerably less amount of motion of the piston as compared with its movement during the use of a slow burning mixture of gasoline and air obtained by the present methods of carburetion in gasoline operated internal combustion engines.

This action of forming the secondary charge may be observed in the operation of an internal combustion engine equipped with the invention through the sight glass 24. Observation through this glass for varying speeds of operation of an internal combustion engine show various colors of light within the ignition chamber. For normal operation of an internal combustion engine at varying speeds without quick acceleration the color or light in the ignition chamber observed through the glass is sky blue or a very light and delicate shade of blue. With an engine operating at a slow speed and where the throttle is suddenly opened for quick acceleration the light observed through the glass 24 will change from this light blue color to a yellow and red. In some cases, such as when slowing down the speed of an engine from a high speed to a low speed it has been observed that the light will change from a light blue color to a darker blue and occasionally lavender or purple. In the operation of this invention it is noted that the sight glass 24 is usually moist on the inside during the observation of the various colors of light observed therethrough.

In operating the same automobile equipped with and without this invention for test purposes it was found that the fuel consumption of the engine varied with the speed. In operating the engine without the invention, the fuel consumption at low speed increased to a maximum when idling and rapidly decreased up to a speed of approximately fifteen miles an hour following which the consumption remains substantially the same or gradually decreased up to thirty-five miles an hour when it began to increase with increases in speed above thirty-five miles per hour showing that the carburetor acted more efficiently between speeds of fifteen and thirty-five miles per hour.

With this invention applied to the same automobile in the manner as illustrated in the drawings the idling jet of the carburetor was eliminated and the engine idled on the secondary fuel charge supplied through the choke member, it being found that the fuel consumption was considerably reduced over that required in operating the engine or the carburetor of the engine alone as above described. With the increasing of speed of the engine the fuel consumption very quickly reduced to a greater extent at a speed of fifteen miles an hour than operation on the carburetor alone, and also gradually increased up to thirty five miles an hour and continued at substantially the same consumption or a slight increase over the remaining increased speed ranges of the motor. During these tests the color observations above described were made and as a result the fuel consumption curves show marked efficiency in operation of the engine and fuel consumption at low speeds and at higher speeds over the carburetion regularly provided on the motor tested which was one of the late Buick models. It also showed economy of fuel over the intermediate speed range in comparison with the carburetor alone which functioned more efficiently at this intermediate speed range between fifteen and thirty five miles per hour.

In the operation of the engine it was found that the engine would develop a greater percentage of power over all speeds and also at varying speeds and that it would pick up speed quicker with this invention applied, than without. This is due to the formation by this apparatus of a charge which ignites and burns more readily, faster and more completely than the ordinary vaporized fuel of a similar grade. This invention provides a structure which permits a quick get-away through the quick pick-up in speed with this invention applied, than with the ordinary carburetor. The use of the invention on an automobile at varying temperatures results in showing that it will readily start under all conditions which is believed to result from the formation of the heated gaseous charge in the ignition chamber 40 which heats and vaporizes the charge obtained from the carburetor.

It is to be understood that this construction as shown in Fig. 2 for the formation of the secondary charge may be well embodied in the carburetor structure so that the carburetor and the secondary charge forming device may be made in one unit which will replace the ordinary carburetor as now used. When constructed in the manner as illustrated in the drawings it forms a structure which is readily attachable in cooperation with the various types of carburetors in present use without modifying the construction thereof. Where the construction of the carburetor provides a joint between the carburetor and the intake manifold at a level lower or higher than the nipple 19 on the secondary charge forming device and in view of the required mounting of the device at a predetermined relation with respect to the float chamber to obtain the proper level of fuel in the jet nozzle 46, there is provided a modified form of choke member from that shown in Fig. 2 which is illustrated in detail in Figs. 6 and 7. This choke member is indicated at 60 and is in the form of a cast block member 61 having offset extensions 62 and 63 at opposite sides thereof. This block member is provided with a bore 64 extending through the extensions 62 and 63 and communicating within the block member. The ends of the extensions 62 and 63 are threaded for engagement in the section 16 of the secondary charge forming device and the flange member 13 which is clamped between the carburetor and intake manifold. In order to retain this choke member 60 against rotation relative to the secondary charge forming device, a pair of clamping members 65 are engaged at opposite sides against the section 16 and have the opposite ends bolted to the member 60 by suitable machine screws or the like 66.

Again referring to the curved portion 15 of the spacer member it is to be noted that when the gases pass through this portion under suction in the intake manifold that a suction is created in this curved portion which aids in maintaining suction in the choke member 18 and also in distributing the charge received from the choke member more evenly for mixture with the charge in the intake manifold.

In the operation of this invention over a period of approximately eight months in the usual use of an automobile it was found that no carbon or other deposit was formed in the ignition chamber or the choke member and that no carbon deposit was formed in the cylinders of the motor but only a light, soft, oily substance in the form of a thin film in the cylinders which could be easily wiped off.

A further feature of this invention which is important in its operation is the relation of the air passage 37 at the opposite side of the ignition chamber from the choke member as a result of which air admitted through the passage 37 has a tendency to travel upwardly along the outer side of the ignition chamber and then curve to the right as shown in Fig. 2 across the spark plug and into the choke member as a result of which it has been found that a better operation of the device is obtained than with this passage placed in other locations. It is also of advantage to have the passage 43 directly adjacent to the connection of the nipple 51 for the air intake to the secondary carbureting device as shown in Fig. 2. If desired, it is to be understood that the jet unit 44 may be constructed for suitable adjustment in the section 17 to vary the level of fuel in the metering jet 46.

What is claimed is:

1. A liquid fuel gasifier, comprising a mixing chamber having a liquid fuel inlet and air inlet on one side and an atomized liquid fuel and air mixture outlet on another side, a divider in said mixing chamber including a perforated transverse wall and a screen secured to opposite sides of said chamber, a liquid fuel vaporizing and gasifying chamber at one side of said mixing chamber, said mixture outlet communicating with one end thereof, and a sparking device and a gas outlet at the opposite end of said vaporizing and gasifying chamber.

2. A liquid fuel gasifier, comprising a mixing chamber having an inlet for raw liquid fuel and air, and an outlet for atomized fuel, a tube communicating with said mixing chamber, a liquid fuel supply jet arranged within and spaced from said tube, a vaporizing and gasifying chamber having the outlet from said mixing chamber communicating with one end thereof and having an outlet for gas at the opposite end thereof, and a sparking device arranged in said vaporizing and gasifying chamber.

3. A liquid fuel gasifier, comprising a mixing chamber having an inlet for raw liquid fuel and air, and an outlet for atomized liquid fuel, a tube communicating with said mixing chamber inlet, a liquid fuel supply jet arranged axially within and spaced from said tube, an air inlet chamber surrounding said tube, a vaporizing and gasifying chamber having the outlet for atomized fuel from said mixing chamber communicating therewith, said vaporizing and gasifying chamber having an outlet for gas, and a sparking device arranged in said vaporizing and gasifying chamber.

4. A liquid fuel gasifier, comprising a mixing chamber having an inlet for raw liquid fuel and air, and an outlet for atomized fuel, a siphon tube communicating with said mixing chamber inlet, a liquid fuel supply jet arranged within and spaced from said siphon tube, an air inlet chamber surrounding said siphon tube and jet and provided with an air inlet communicating with said siphon tube, a supply nipple mounted in the bottom of said air chamber and carrying said jet, a vaporizing and gasifying chamber having an outlet for gas and having the outlet from said mixing chamber communicating therewith, and a sparking device arranged in said vaporizing and gasifying chamber.

5. A liquid fuel gasifier, comprising a mixing chamber having an inlet for raw liquid fuel and air, and an outlet for atomized fuel, a tube communicating with said mixing chamber inlet, a liquid fuel supply jet arranged axially within and spaced from said tube to provide an air passage around said jet, an air chamber around said tube and jet provided with an air inlet communicating with said tube, a supply nipple communicating with said jet and provided with a liquid fuel inlet, a vaporizing and gasifying chamber having an outlet for gas, said outlet for the mixing chamber having communication with said vaporizing and gasifying chamber, and a sparking device arranged in said vaporizing and gasifying chamber.

6. A liquid fuel gasifier, comprising a mixing chamber having an inlet for raw liquid fuel and air, and an outlet for atomized fuel, a tube communicating with said mixing chamber inlet, a liquid fuel supply jet within and spaced from said tube, an air chamber surrounding said tube and jet and provided with an air inlet communicating with said tube, a supply nipple on said supply chamber communicating with said jet and provided with a liquid fuel inlet, a screw plug on the lower end of said nipple, a vaporizing and gasifying chamber having an outlet for gas, said outlet for said mixing chamber communicating with said vaporizing and gasifying chamber, and a sparking device in said vaporizing and gasifying chamber.

HERBERT V. A. FERGUSON.